July 17, 1928.  S. K. DENNIS  1,677,127

LAND ROLLER BEARING

Filed April 30, 1923

Inventor.
Samuel K. Dennis,
By W P Bascute
Atty.

Patented July 17, 1928.

1,677,127

UNITED STATES PATENT OFFICE.

SAMUEL K. DENNIS, OF CHICAGO, ILLINOIS, ASSIGNOR TO INTERNATIONAL HARVESTER COMPANY, OF CHICAGO, ILLINOIS, A CORPORATION OF NEW JERSEY.

LAND-ROLLER BEARING.

Application filed April 30, 1923. Serial No. 635,540.

My invention relates to land roller construction and is directed to improvement of the bearing boxes supporting the ends of the roller shafts.

In rollers of the type known as land packers or sub-soil packers in which one or more gangs of packer wheels or disks are assembled and clamped together on a shaft, it is sometimes desirable to remove two or three of the disks from the shaft and move the remaining disks in the gang apart from the middle so that a row of growing plants may be straddled by the implement, and the principal object of my invention is to provide bearing boxes for the disk shafts that will be readily detachable and removable, thereby permitting the roller shaft to be withdrawn axially and one or more disks removed. A further object is to provide adjustable clamping means in connection with the bearing boxes for clamping the disks together on the shaft.

With these main objects in view, the invention resides in the construction and arrangement of parts or the equivalents thereof hereinafter described and claimed.

Referring to the drawings—

Figure 1:
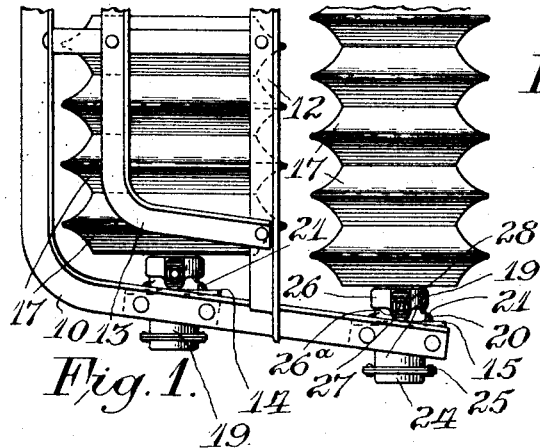
Fig. 1 is a plan view of one end of a land packer embodying my invention.
Figure 2:
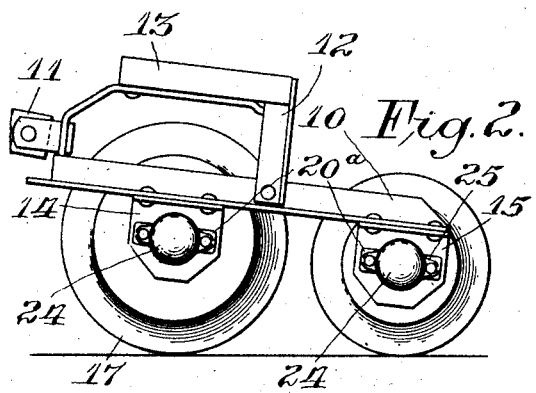
Fig. 2 is a similar end view.
Figure 5:
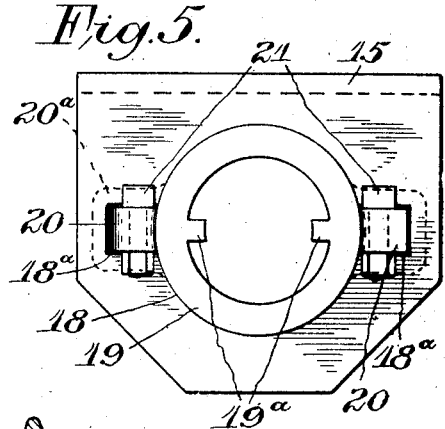
Fig. 5 is a detail view of a supporting bracket and sleeve viewed from the inner side.

In the present instance, I have illustrated my invention as applied to a land packer comprising a horizontal U-shaped main frame member 10, to the front of which is pivoted a tongue 11, and the upper frame members 12, 13 all rigidly connected together. The horizontal frame member 10 is preferably formed of angle iron having one flange or web positioned horizontally as shown in Figs. 1 and 2 and to this flange there is riveted or otherwise fixed on each side of the machine bearing brackets 14, 15, in which are journaled front and rear shafts 16 carrying gangs of packer wheels or disks 17. The particular manner in which the shafts 16 are journaled in the brackets 14 and 15, involving a novel arrangement and combination of parts, constitutes the subject-matter of my present invention and this construction will now be described.

Figure 4:
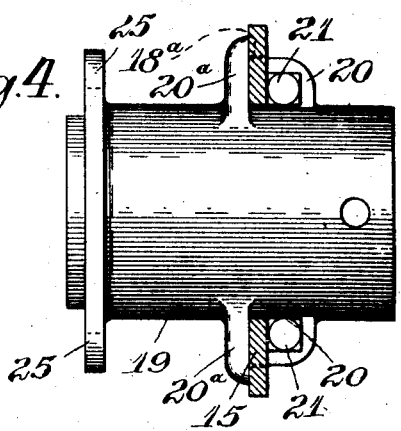
Fig. 4 is a plan view of one of the journal sleeves.
Figure 3:
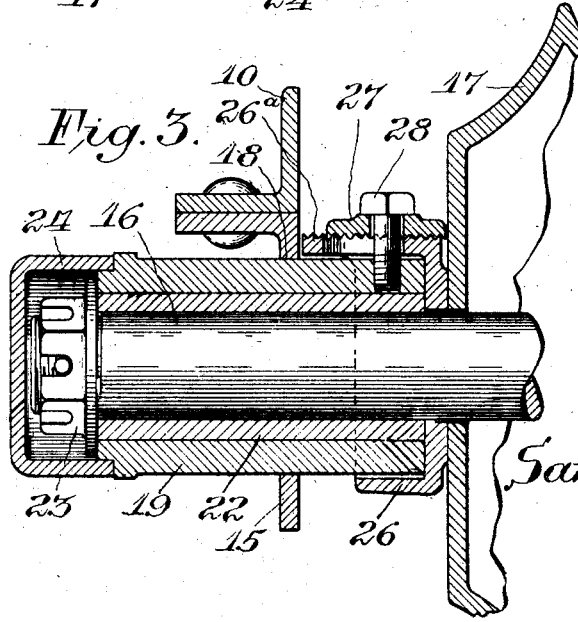
Fig. 3 is a vertical sectional view on an enlarged scale through one of the bearing boxes.
Figure 6:
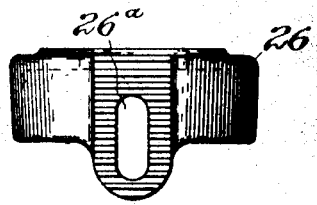
Fig. 6 is a detail view of a clamping collar.

Each bracket 14 and 15 is formed with an opening 18 having opposite lateral extensions 18$^a$ and in this opening there is fitted a journal sleeve 19 which is provided with radial lugs or ears 20 engaging the extensions 18$^a$ referred to. The journal sleeve 19 is designed to extend outwardly through the bracket about half its length and the lugs 20 are formed with flanged portions 20$^a$ which engage the outer face of the bracket. The lugs 20 extend inwardly behind the bracket, as best seen in Fig. 4, and are there provided with perforations receiving pins or bolts 21 which engage the rear face of the bracket and constitute retaining elements preventing withdrawal of the journal sleeve. Within the journal sleeve 19 there is the usual wood bushing 22 which is held in position by the inward projections 19$^a$ on sleeve 19 and the shaft 16 journaled in the bushing is retained by the crown nut 23 threaded and locked on its end in the usual manner. The outer end of the journal sleeve 19 is closed by the hub cap 24 which is bolted or otherwise secured to ears 25 on the sleeve. With the construction so far described, it will be evident that any one of the journal sleeves may be removed outwardly through the bearing bracket by simply removing the two retaining elements 21 on the inner side of the supporting bracket and that when the journal sleeves on each end of a shaft 16 are thus removed, the shaft may be withdrawn axially from the disks 17 and the desired number of disks removed and the shaft and journal sleeves then replaced, when replacing of the pins or bolts 21 will effectively secure the parts in assembled position. As means for clamping the disks together as well as for forming a dust cap on the inner end of the journal sleeve, I provide the flanged clamping ring 26 which fits over the inner end of the journal sleeve 19 in the manner best seen in Fig. 3 and has its outer face in contact with the side of the outer disk 17. In order that the disks may be kept in contact with each other and any wear taken up when necessary, each clamping ring 26 is formed on its upper side with a slotted extension 26$^a$ which preferably has its upper surface corrugated to cooperate with a corrugated cap 27 and the sleeve 19 is provided at its inner end with a screw threaded opening which receives the end of a screw bolt 28 passed through the cap 27 and the slot in the extension 26ª of the clamping ring 26. This construction permits the clamping ring to be adjusted inwardly toward the disk 17 to the extent necessary and there securely clamped, effectively retaining the disks in proper relation to each other while also closing the inner end of the journal sleeve 19. It will be understood that when the journal sleeve is to be withdrawn, as above described, it will also be necessary to remove the screw bolt 28 as well as the retaining elements 21.

The construction described exemplifies the preferred form of my invention and such modifications may be made as fall within the scope of the following claims.

I claim as my invention:

1. In a land roller, the combination with the frame, shaft, and roller thereon, of an end bracket secured to the frame, a journal sleeve supported in said bracket and receiving one end of the roller shaft, a clamping member carried on the inner end of said journal sleeve and bearing on the end of the roller, and axially adjustable connecting means between the sleeve and clamping member.

2. In a land roller, the combination with the frame, shaft, and roller thereon, of an end bracket secured to the frame and formed with an opening, a journal sleeve of uniform diameter fitted in said opening and receiving the end of the roller shaft, detachable retaining elements attached to said sleeve and engaging the inner side of said bracket, and a clamping ring bearing against the end of the roller and secured to the inner end of said sleeve by means permitting adjustment of said ring axially.

In testimony whereof I affix my signature.

SAMUEL K. DENNIS.